United States Patent
Marking et al.

(10) Patent No.: US 7,846,354 B2
(45) Date of Patent: Dec. 7, 2010

(54) METHOD OF MAKING RED-EMITTING BORATE PHOSPHOR

(75) Inventors: Gregory A. Marking, Sayre, PA (US); Thomas M. Snyder, Laceyville, PA (US)

(73) Assignee: Osram Sylvania Inc., Danvers, MA (US)

( * ) Notice: Subject to any disclaimer, the term of this patent is extended or adjusted under 35 U.S.C. 154(b) by 561 days.

(21) Appl. No.: 12/030,336

(22) Filed: Feb. 13, 2008

(65) Prior Publication Data

US 2008/0213153 A1 Sep. 4, 2008

Related U.S. Application Data

(60) Provisional application No. 60/892,326, filed on Mar. 1, 2007.

(51) Int. Cl.
- C09K 11/77 (2006.01)
- C09K 11/63 (2006.01)
- C09K 11/57 (2006.01)
- C09K 11/55 (2006.01)
- C09K 11/54 (2006.01)

(52) U.S. Cl. .................. 252/301.6 R; 252/301.4 R
(58) Field of Classification Search .......... 252/301.6 R, 252/301.4 R
See application file for complete search history.

(56) References Cited

U.S. PATENT DOCUMENTS

| | | | |
|---|---|---|---|
| 4,319,161 A | 3/1982 | Looye et al. |
| 4,719,033 A | 1/1988 | Chenot et al. |
| 5,068,055 A | 11/1991 | Chenot et al. |
| 5,612,590 A | 3/1997 | Trushell et al. |
| 6,007,741 A | 12/1999 | Hunt, Jr. et al. |
| 6,085,971 A | 7/2000 | Tews et al. |
| 6,794,810 B2 | 9/2004 | Gruber et al. |
| 7,138,757 B2 | 11/2006 | Toth et al. |
| 7,221,084 B2 | 5/2007 | Fan et al. |
| 7,259,509 B2 | 8/2007 | Meiss et al. |
| 7,288,215 B2 | 10/2007 | Fan et al. |

OTHER PUBLICATIONS

Lehamnn et al, "Uber die Hydrate des Magnesium(1:3)-borates, MgB6O10×H2O", Z. Anorg. Alig. Chem. 350, pp. 168-176 (1967), article and translation.*

Lehmann et al, "Uber ein wasserhaltiges Magnesiumhexaborat der Formel MgB6O10×5H2O", Z. Anorg. Alig. Chem. 350, pp. 168-176 (1967), article and translation.*

U.S. Appl. No. 12/030,374, filed Feb. 13, 2008.
U.S. Appl. No. 12/030,247, filed Feb. 13, 2008.

* cited by examiner

*Primary Examiner*—C. Melissa Koslow
(74) *Attorney, Agent, or Firm*—Robert F. Clark

(57) ABSTRACT

There is described a method of producing a red-emitting manganese and cerium co-activated gadolinium magnesium zinc pentaborate phosphor that comprises combining a hydrated hexaborate of zinc, magnesium, and manganese with oxides of Gd and Ce to form a mixture, and firing the mixture in a slightly reducing atmosphere to form the phosphor. Preferably, the hydrated hexaborate has an approximate composition represented by $(Zn,Mg,Mn)B_6O_{10}\cdot XH_2O$, where X is 5.3 to 6.2.

11 Claims, 1 Drawing Sheet

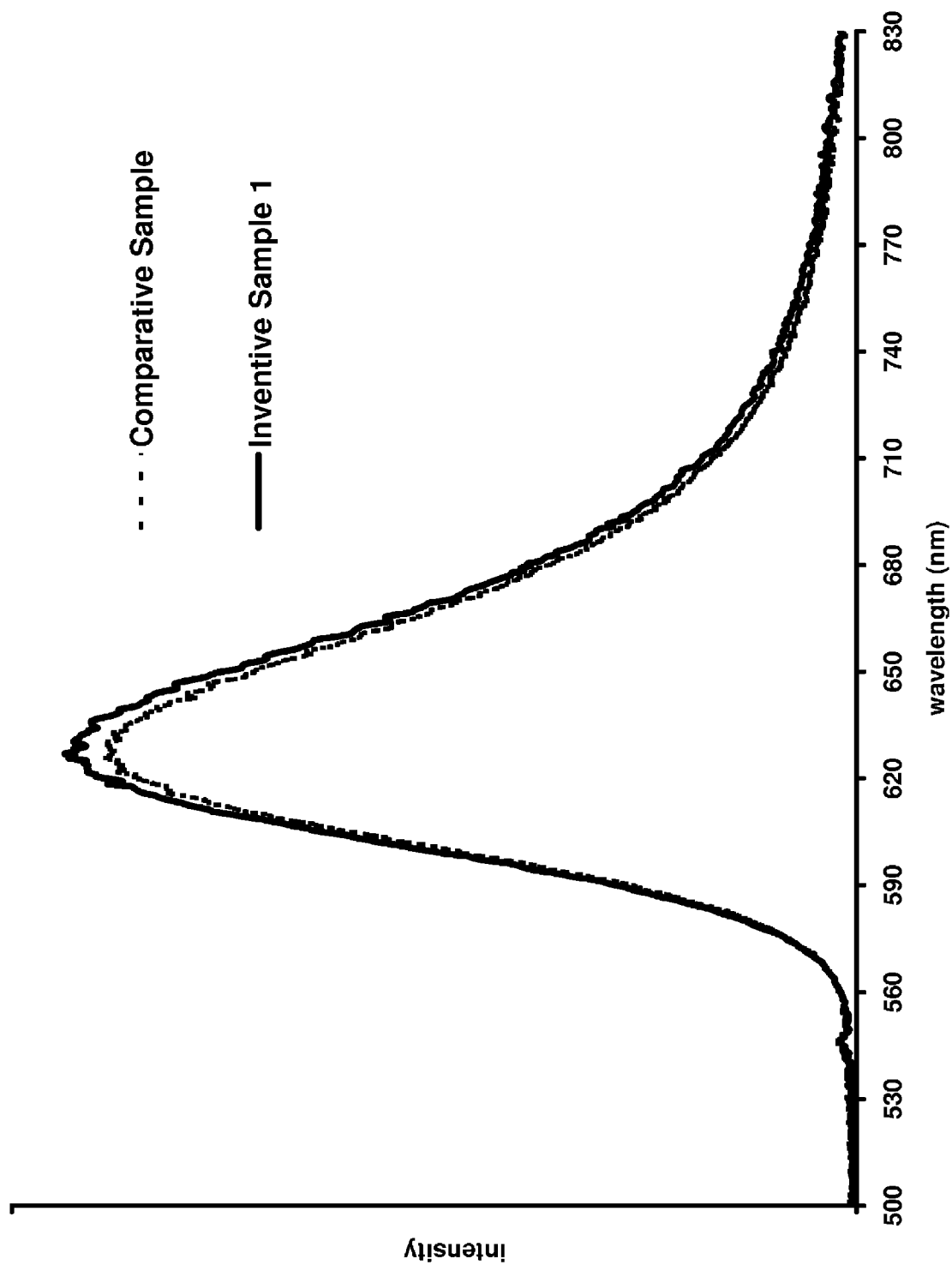

METHOD OF MAKING RED-EMITTING BORATE PHOSPHOR

CROSS REFERENCES TO RELATED APPLICATIONS

This application claims the benefit of U.S. Provisional Application No. 60/892,326, filed Mar. 1, 2007, which is incorporated herein by reference.

BACKGROUND OF THE INVENTION

The use of manganese and cerium co-activated gadolinium magnesium zinc pentaborate phosphors in mercury-vapor discharge lamps for fluorescent lighting applications is well established. The phosphor, which may be represented by the general formula $(Ce,Gd)(Mg,Zn,Mn)B_5O_{10}$, is a broad-band red-emitting phosphor which has a deeper red color than the most common red-emitting phosphor, europium-activated yttrium oxide, $Y_2O_3$:Eu, and is useful for improving the Color Rendering Index (CRI) of mercury-vapor fluorescent lamps.

For example, the use of $Gd(Zn,Mg)B_5O_{10}$:Ce,Mn to provide high color rendering in high-output compact fluorescent lamps is disclosed in U.S. Pat. No. 7,138,757, while the same phosphor written as $(Ce,Gd)(Zn,Mg)B_5O_{10}$:Mn is disclosed for use in low-pressure gas discharge lamps for the same purpose in U.S. Pat. No. 6,794,810. In U.S. Pat. No. 7,259,509, the phosphor is disclosed for use in mercury low-pressure discharge lamps for illuminating plants and the related phosphor $Gd_{1-x-y}Ce_xTb_y(Mg)_{1-p}Mn_pB_5O_{10}$ is disclosed for use in fluorescent lamps with CRI values of at least 82 in U.S. Pat. No. 5,612,590.

The synthesis of metaborate phosphors with the general composition $(Y,La)_{1-x-y-z}Ce_xGd_yTb_z(Mg,Zn)_{1-p}Mn_pB_5O_{10}$ (which includes $Ce_xGd_y(Mg,Zn)_{1-p}Mn_pB_5O_{10}$) is described in U.S. Pat. No. 4,319,161. The method of producing these pentaborate phosphors involves dry mixing oxides of the rare earth elements, the oxide or hydrated carbonate-hydroxide of magnesium, manganese carbonate, the oxide of zinc and boric acid, and then subjecting the mixture to two or three firings in a weakly reducing atmosphere, typically with a comminution step in between.

Such repeated grinding and firing methods are labor intensive, more time consuming, and ultimately more costly than if the phosphor could be prepared in fewer steps, in particular a single-step firing method. Thus, it would be advantageous to have a simpler, more cost-effective method to produce a $(Ce,Gd)(Mg,Zn,Mn)B_5O_{10}$ phosphor.

SUMMARY OF THE INVENTION

It is an object of this invention to obviate the disadvantages of the prior art.

It is a further object of this invention to provide an improved method of producing a red-emitting manganese and cerium co-activated gadolinium magnesium zinc pentaborate phosphor.

In accordance with an aspect of the invention, there is provided a method of producing a red-emitting manganese and cerium co-activated gadolinium magnesium zinc pentaborate phosphor. Preferably, the phosphor is represented by the general formula $(Gd_{1-x}Ce_x)(Zn_{1-y-z}Mg_yMn_z)B_5O_{10}$, where x has a value from 0.01 to 0.80, y has a value from 0 to 0.98, z has a value from 0.02 to 0.50, and $y+z \leq 1$. More preferably, x has a value from 0.15 to 0.45, y has a value from 0.20 to 0.80, and z has a value from 0.05 to 0.20.

In accordance with another aspect of the invention, the method involves the use of a hydrated hexaborate of zinc, magnesium and manganese, as a boron source. The hydrated hexaborate preferably has an approximate composition (Zn, Mg,Mn)$B_6O_{10}$·X$H_2O$, where X is preferably from 5.3 to 6.2. The relative amounts of Zn, Mg, and Mn in the hydrated hexaborate vary depending upon the particular phosphor to be formed. In particular, the hydrated hexaborate more preferably has a composition represented by $(Zn_{1-y-z}Mg_yMn_z)B_6O_{10}$·X$H_2O$. The hydrated hexaborate is combined with oxides of Gd and Ce, and fired in a slightly reducing atmosphere. Preferably, the mixture is fired once at a temperature of from about 900° C. to about 1040° C. More preferably, the mixture is fired for 3.0 to 4.0 hours in a 99% $N_2$/1% $H_2$ atmosphere to form the phosphor.

In accordance with another aspect of the invention, the hydrated hexaborate is formed by dissolving boric acid in water to form a boric acid solution, heating the boric acid solution to a temperature of about 90° C., adding carbonates of magnesium, zinc and manganese to the boric acid solution, reducing the temperature of the boric acid solution to a lower temperature of less than about 50° C. to form a precipitate, dewatering the precipitate and drying the precipitate.

BRIEF DESCRIPTION OF THE DRAWING

The FIGURE shows the emission spectra between 500 nm and 830 nm of a comparative $(Gd,Ce)(Zn,Mg,Mn)B_5O_{10}$ phosphor and a phosphor made according to this invention.

DETAILED DESCRIPTION OF THE INVENTION

For a better understanding of the present invention, together with other and further objects, advantages and capabilities thereof, reference is made to the following disclosure and appended claims taken in conjunction with the above-described drawing.

The present invention is a method of preparing a red-emitting manganese and cerium co-activated gadolinium magnesium zinc pentaborate phosphor which does not require the repeated grinding and firing steps that can lead to increased manufacturing costs. Furthermore, this invention provides for synthesis of phosphor with significantly increased brightness relative to a commercial material prepared using the conventional method.

The method utilizes a hydrated hexaborate of zinc, magnesium and manganese, as a boron source. The hydrated hexaborate, which is preferably prepared as a precipitate, is combined with oxides of Gd and Ce, and fired once in a slightly reducing atmosphere. This is different from prior art methods which combine separate oxide powders and magnesium oxide with a large amount of boric acid which can contaminate the furnace. The present method results in a greater homogeneity of the fired cake and subsequently a higher brightness. In addition, the method of this invention preferably requires only one firing step instead of 2-3 firing steps with additional grinding steps in between the firings.

In a preferred method, $(Zn,Mg,Mn)B_6O_{10}$·X$H_2O$ is formed by first dissolving about 8.0 to about 10.0 millimoles of boric acid per 1.0 milliliter of de-ionized water. The slurry is agitated and heated to about 90° C. Secondly, about 1.33 to about 1.67 millimoles of a magnesium carbonate, zinc carbonate, and manganese carbonate mixture per 1.0 milliliter of de-ionized water are slowly added into the heated solution and the precipitate is digested for up to 10 minutes at >90° C. and quickly cooled (~1° C. per min) to a temperature <45° C. This material is filtered, dried, and sifted before further use.

To form the $(Ce,Gd)(Mg,Zn,Mn)B_5O_{10}$ phosphor, the hydrated hexaborate is mixed with oxides of Gd and Ce in the appropriate amounts, and fired in a slightly reducing atmosphere. Preferably, the mixture is fired once at a temperature of from about 900° C. to about 1040° C. Phosphors prepared with equivalent amounts of Zn and Mg are best fired at 940° C. to 980° C. Phosphor prepared with high levels of Mn and/or Zn are best fired at slightly lower temperatures, while phosphor prepared with high levels of Mg are best fired at slightly higher temperatures.

The present invention will be described in further detail with reference to the following examples. However, it should be understood that the present invention is by no means restricted to such specific examples.

As used herein, the term "carbonate" and its general chemical formula "$RCO_3$" where R is Zn, Mg, or Mn are to be broadly construed to include more complex hydrated carbonate forms such as $Mg_5(CO_3)_4(OH)_2(H_2O)_4$.

EXAMPLE 1

$(Zn_{0.45}Mg_{0.45}Mn_{0.10})B_6O_{10} \cdot XH_2O$ Precipitate Preparation

An amount of $(Zn_{0.45}Mg_{0.45}Mn_{0.10})B_6O_{10} \cdot XH_2O$ was prepared using 1 liter of de-ionized water, 528.01 grams of boric acid, 54.52 grams of $MgCO_3$, 71.41 grams of $ZnCO_3$, and 17.52 grams of $MnCO_3$. The masses of the carbonates were corrected by their assays to give the following relative molar ratios: 6.00 moles $H_3BO_3$, 0.45 moles of $MgCO_3$, 0.45 moles of $ZnCO_3$, and 0.10 moles of $MnCO_3$. The carbonates were sifted through a 275 micron screen and well blended before use. The boric acid was added to the water, agitated, and heated to approximately 90° C.-95° C. before the carbonate mixture was slowly added. After the addition was complete, the sample was digested for 10 minutes at approximately >90° C. and then quickly cooled over the time period of 1 hour to <50° C. This material was dewatered in a filter funnel and then transferred to a glass tray and dried at 135° C. for approximately 16 hours and sifted through a 275 micron screen. The waters of hydration in the dried precipitate are typically found to be in the range X=5.3 to 6.2. Slower cooling rates give a final product with lower waters of hydration than fast cooling rates. X-ray powder diffraction indicates the presence of $MgB_6O_{10} \cdot 5H_2O$, $Zn_3B_{10}O_{18} \cdot 14H_2O$, and $ZnB_{10}O_{16} \cdot 4.5H_2O$. Additional phases may include $MgB_3O_3(OH)_5 \cdot 5H_2O$ and $Mn_2B_6O_{11+x}$. It is likely that Zn, Mg, and Mn exhibit some solubility in all of the above mentioned phases. It is readily apparent that the approximate composition $(Zn,Mg,Mn)B_6O_{10} \cdot XH_2O$ can be attained by appropriate mixtures of the above-mentioned phases.

Inventive Sample 1

$(Gd,Ce)(Mg,Zn,Mn)B_5O_{10}$ Red-Emitting Phosphor

For Inventive Sample 1, a $Gd_{0.70}Zn_{0.45}Mg_{0.45}B_5O_{10}$:$Ce_{0.30}$,$Mn_{0.10}$ phosphor was prepared by thoroughly blending and firing of a mixture of $Gd_2O_3$, $CeO_2$, and the $(Zn_{0.45}Mg_{0.45}Mn_{0.10})B_6O_{10} \cdot XH_2O$ precipitate described in Example 1.

The $Gd_2O_3$, $CeO_2$, and $(Zn_{0.45}Mg_{0.45}Mn_{0.10})B_6O_{10} \cdot XH_2O$ materials were assayed and 191.25 grams $Gd_2O_3$, 77.45 grams $CeO_2$, and 564.66 grams of $(Zn_{0.45}Mg_{0.45}Mn_{0.10})B_6O_{10} \cdot XH_2O$ were weighed, added to a 1000 ml plastic bottle, and then blended on a paint shaker. These amounts correspond to molar ratios of 0.70 moles $Gd_2O_3$, 0.30 moles $CeO_2$, and 1.00 moles $(Zn_{0.45}Mg_{0.45}Mn_{0.10})B_6O_{10}$. Table 1 lists the raw materials, their molar ratios, and the quantities used for Inventive Sample 1. The mixture was fired in silica boats for 3.0 hours at 960° C. in a slightly reducing 99% $N_2$/1% $H_2$ atmosphere. The fired cakes were soaked in de-ionized water for 2 hours, dried, and screened through a 275-micron screen. This screened material was milled by adding 160 grams of fired phosphor, 1600 grams of spherical 5 mm YTZ media, and 220 ml of de-ionized water to a 500 ml plastic bottle and roll milling for 4 hours at 78 rpm. The media were removed and the milled phosphor dried, sifted through a 55-micron screen, and analyzed. XRF elemental analyses were performed, particle size measured, and brightness measured using 254 nm excitation radiation from a mercury discharge lamp. The physical properties of the inventive and comparative samples are listed in Table 2 and the emission spectra are shown in FIG. 1. The comparative sample was a commercial $Gd(Zn,Mg)B_5O_{10}$:Ce,Mn phosphor (Type L-165, OSRAM GmbH).

TABLE 1

Formulation of $Gd_{0.70}Zn_{0.45}Mg_{0.45}B_5O_{10}$:$Ce_{0.30}$,$Mn_{0.10}$ Inventive Sample 1

| | Raw material | | |
| --- | --- | --- | --- |
| | $Gd_2O_3$ | $CeO_2$ | $(Zn,Mg,Mn)B_6O_{10} \cdot XH_2O$ |
| Molecular weight | 362.50 | 172.12 | 270.66 |
| Assay | 0.9951 | 1.000 | 0.719 |
| Mole ratio | 0.70 | 0.30 | 1.00 |
| Grams | 191.25 | 77.45 | 564.66 |

TABLE 2

Properties of $Gd_{0.70}Zn_{0.45}Mg_{0.45}B_5O_{10}$:$Ce_{0.30}$,$Mn_{0.10}$ and Comparative $Gd(Zn, Mg)B_5O_{10}$:Ce,Mn Phosphor Sample

| | Inventive Sample 1 | Comparative Sample |
| --- | --- | --- |
| Particle size $D_{50}$ (microns) | 7.18 | 7.86 |
| Relative Brightness | 106% | 100% |
| Color Coord X | 0.6547 | 0.6525 |
| Color Coord Y | 0.3370 | 0.3383 |
| XRF Elemental Analyses | | |
| % Mg | 2.65 | 2.47 |
| % Mn | 1.06 | 0.97 |
| % Zn | 6.87 | 7.43 |
| % Ce | 9.93 | 9.93 |
| % Gd | 27.12 | 27.27 |
| % $B_5O_{10}$ | 52.37 | 51.93 |

While there have been shown and described what are at present considered to be preferred embodiments of the invention, it will be apparent to those skilled in the art that various changes and modifications can be made herein without departing from the scope of the invention as defined by the appended claims. In particular, although a single-step firing process is preferred, the process may less advantageously include additional firing steps.

We claim:

1. A method of producing a red-emitting manganese and cerium co-activated gadolinium magnesium zinc pentaborate phosphor comprising:
    (a) combining a hydrated hexaborate of zinc, magnesium and manganese with oxides of Gd and Ce to form a mixture; and
    (b) firing the mixture in a slightly reducing atmosphere to form the phosphor.

2. The method of claim 1 wherein the hydrated hexaborate has an approximate composition represented by $(Zn,Mg,Mn)B_6O_{10} \cdot XH_2O$, where X is 5.3 to 6.2.

3. The method of claim 1 wherein the phosphor has a formula $(Gd_{1-x}Ce_x)(Zn_{1-y-z}Mg_yMn_z)B_5O_{10}$, where x has a value from 0.01 to 0.80, y has a value from 0 to 0.98, z has a value from 0.02 to 0.50, and $y+z \leq 1$.

4. The method of claim 3 wherein x has a value from 0.15 to 0.45, y has a value from 0.20 to 0.80, and z has a value from 0.05 to 0.20.

5. The method of claim 1 wherein the mixture is fired at a temperature of from about 900° C. to about 1040° C. in a 99% $N_2$/1% $H_2$ atmosphere.

6. The method of claim 1 wherein the hydrated hexaborate is formed by dissolving boric acid in water to form a boric acid solution, heating the boric acid solution to a temperature of about 90° C., adding carbonates of magnesium, zinc and manganese to the boric acid solution, reducing the temperature of the boric acid solution to a lower temperature of less than about 50° C. to form a precipitate, dewatering the precipitate and drying the precipitate to form the hydrated hexaborate.

7. The method of claim 6 wherein the boric acid solution contains about 8.0 to about 10.0 millimoles of boric acid per 1.0 milliliter of water and about 1.33 to about 1.67 millimoles of a mixture of magnesium carbonate, zinc carbonate, and manganese carbonate per 1.0 milliliter of water is added.

8. A method of producing a red-emitting $(Gd_{1-x}Ce_x)(Zn_{1-y-z}Mg_yMn_z)B_5O_{10}$ phosphor, where x has a value from 0.01 to 0.80, y has a value from 0 to 0.98, z has a value from 0.02 to 0.50, and $y+z \leq 1$, the method comprising:
(a) combining a hydrated hexaborate with oxides of Gd and Ce to form a mixture, the hydrated hexaborate having a composition represented by $(Zn_{1-y-z}Mg_yMn_z)B_6O_{10} \cdot XH_2O$, where X is 5.3 to 6.2; and
(b) firing the mixture at a temperature of from about 900° C. to about 1040° C. in a slightly reducing atmosphere to form the phosphor.

9. The method of claim 8 wherein x has a value from 0.15 to 0.45, y has a value from 0.20 to 0.80, and z has a value from 0.05 to 0.20.

10. The method of claim 8 wherein the hydrated hexaborate is formed by dissolving boric acid in water to form a boric acid solution, heating the boric acid solution to a temperature of about 90° C., adding carbonates of magnesium, zinc and manganese to the boric acid solution, reducing the temperature of the boric acid solution to a lower temperature of less than about 50° C. to form a precipitate, dewatering the precipitate and drying the precipitate to form the hydrated hexaborate.

11. The method of claim 10 wherein the boric acid solution contains about 8.0 to about 10.0 millimoles of boric acid per 1.0 milliliter of water and about 1.33 to about 1.67 millimoles of a mixture of magnesium carbonate, zinc carbonate, and manganese carbonate per 1.0 milliliter of water is added.

\* \* \* \* \*